Figure 8:
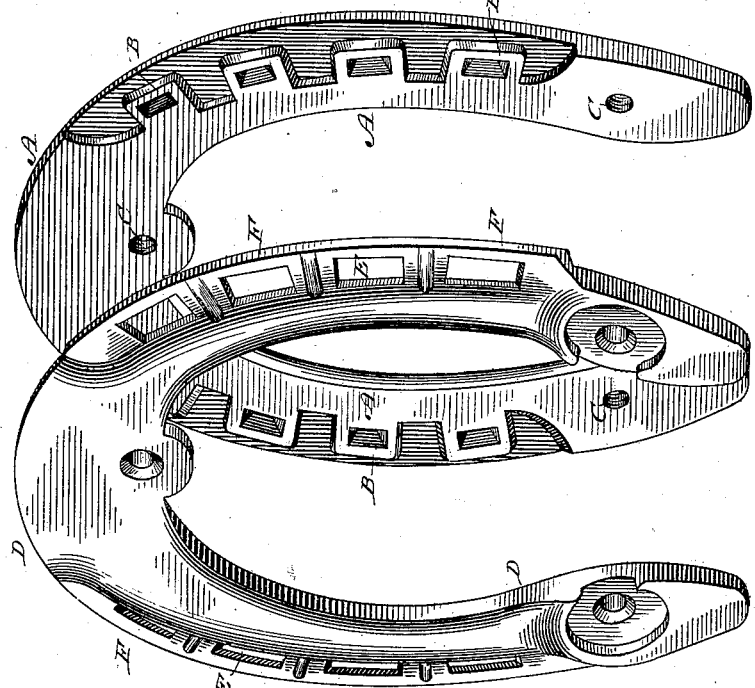

(No Model.) 2 Sheets—Sheet 1.
A. C. HAWES.
DUPLEX HORSESHOE.
No. 334,660. Patented Jan. 19, 1886.
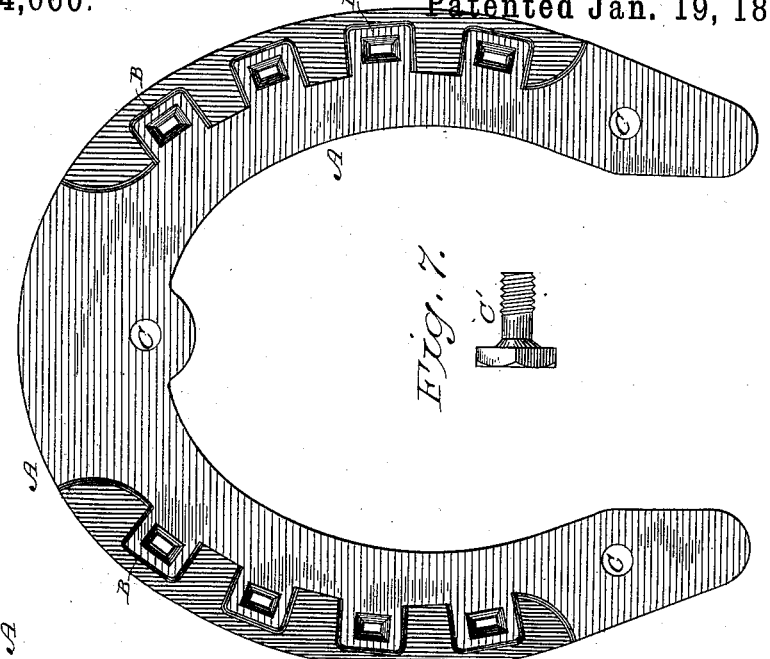
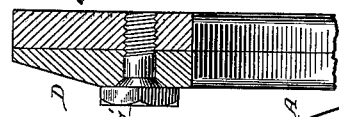
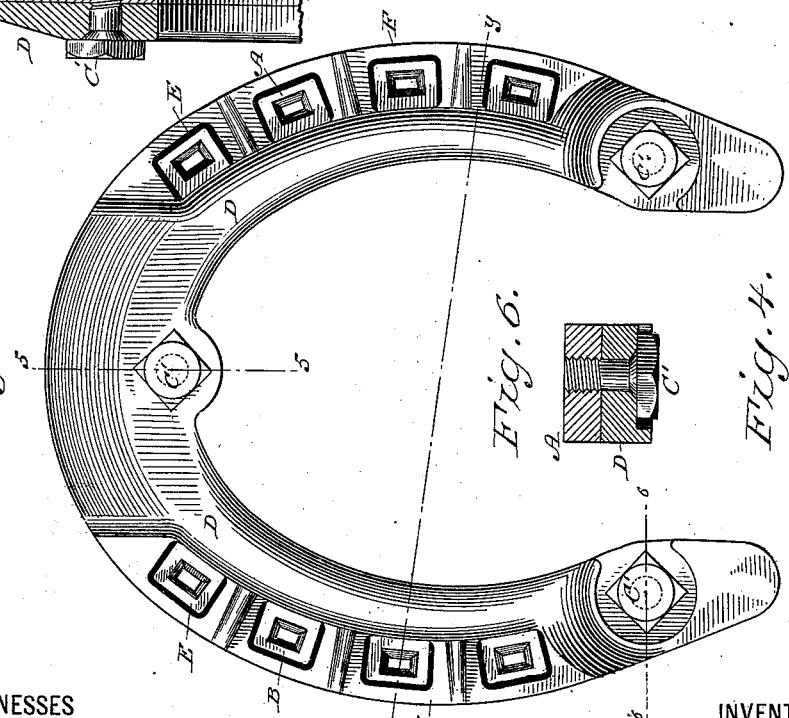
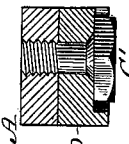
WITNESSES
Ed. A. Newman.
Al. C. Newman.
INVENTOR
Arnold C. Hawes,
By his Attorneys (No Model.) 2 Sheets—Sheet 2.

A. C. HAWES.
DUPLEX HORSESHOE.

No. 334,660. Patented Jan. 19, 1886.

WITNESSES
Ed. A. Newman
Al. C. Newman

INVENTOR
Arnold C. Hawes,
By his Attorneys
Baldwin, Hopkins, & Peyton.

N. PETERS, Photo-Lithographer, Washington, D. C.

UNITED STATES PATENT OFFICE.

ARNOLD C. HAWES, OF NOROTON, CONNECTICUT.

DUPLEX HORSESHOE.

SPECIFICATION forming part of Letters Patent No. 334,660, dated January 19, 1886.

Application filed August 7, 1885. Serial No. 173,819. (No model.)

*To all whom it may concern:*

Be it known that I, ARNOLD C. HAWES, of Noroton, Fairfield county, Connecticut, have invented certain Improvements in Duplex Horseshoes, of which the following is a specification, reference being made to the accompanying drawings.

My present invention embodies a modification of and improvement upon that shown in my pending patent application, Serial No. 173,644, filed August 5, 1885, to which I refer for a general description of the features common to duplex horseshoes, and of my previous improvements therein.

The object of my present invention is to obtain a duplex horseshoe in which the hoof-plate is entirely covered and protected by the shoe-plate, and which yet affords access to the nail-holes and nails while the two plates are united, which provides an adequate support and protection for the head of each nail, which utilizes the devices by which the foregoing ends are accomplished to effect a thorough doweling together of the two plates composing the shoe, and which, finally, embodies all the foregoing desirable features, and yet enables me to construct the hoof-plate so that its under surface is flat and without any projections below or beyond its normal thickness. When the shoe-plate is removed, the hoof-plate, if thus constructed, forms a suitable shoe for the horse when standing in the stable, or even when on the road. In previous shoes (as, for example, the one shown in my previous application for Letters Patent above referred to) the hoof-plate has on its under surface one or more projecting hubs or bosses. These are dangerous to the horse when in the stable, and are injurious to the floor on which the horse stands. If the horse is used upon the road without shoe-plates, these projecting hubs wear rapidly, thus permitting the nails to become loosened. By means of my present invention I provide a hoof-plate which is practically flat and as well adapted to use—either in the stable or on the road—as the ordinary shoe, and is also so constructed as to suitably unite with and support the shoe-plate, which latter, when used, thoroughly protects the hoof-plate against wear, and yet permits the attachment of the complete shoe to the foot of the horse without the necessity of separating the two plates.

Figure 3:
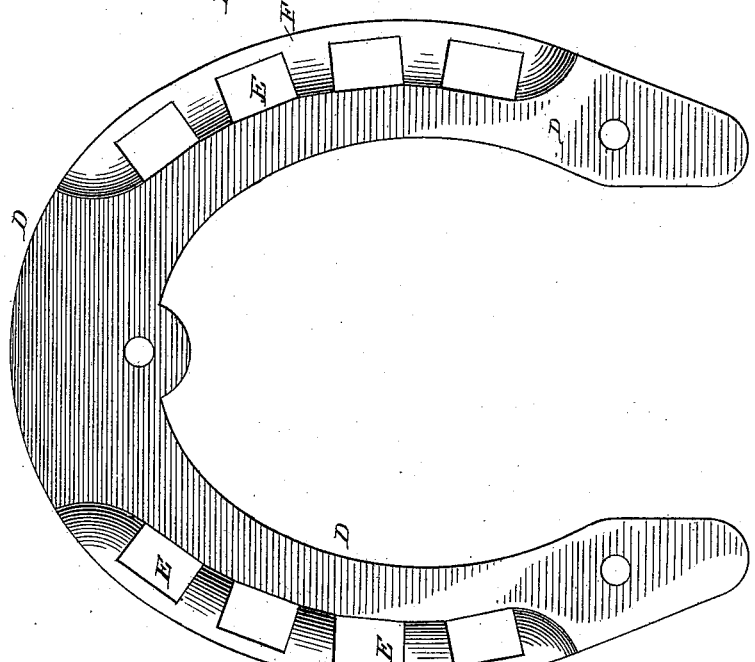

Referring to the drawings, Figure 1 is a representation of the under side of my completed duplex shoe. Fig. 2 shows the under side of the hoof-plate, the shoe-plate being detached. Fig. 3 shows the upper side of the shoe-plate removed from the hoof-plate. Fig. 4 is a cross-section of the two plates on the line $x\,y$ of Fig. 1. Fig. 5 is a sectional view taken through the center of the toe-bolt. Fig. 6 is a similar view taken through one of the heel-bolts. Fig. 7 is a view of one of the bolts detached, and Fig. 8 is a perspective view of the two plates of the shoe, one over the other and slightly separated.

A indicates the hoof-plate, provided with the bosses B, having nail-holes in them enlarged at one end, forming recesses for the nail-heads, as shown in Fig. 4. These bosses are formed not by projections above the general level of the under surfaces of the hoof-plate, but by depressions or cut-away portions of the plate around the bosses.

C indicates screw-threaded holes for the fastening-bolts C', of which there may be one or more.

D indicates the shoe-plate, provided with holes E in upwardly-projecting rims or flanges F, adapted to fit into the depressions around the bosses in the hoof-plate, while the bosses of the latter enter and fill the holes in the shoe-plate.

My present invention only relates to the foregoing elements, and I will therefore not describe the other features of the shoe.

From the drawings it will be seen that the cross-section of my improved hoof-plate—both at the toe and at the heels—is rectangular in form, but that on the flanks between the toe and the heels the cross-section is rabbeted, so that the thickness of the plate at the outer edge is reduced to less than that at the inner edge. A series of bosses, each containing one or more nail-holes, is formed on the depressed surface above referred to, the tops of these bosses rising flush with the inner surface of the hoof-plate. In this way I succeed in forming bosses which, while practically raised above one surface of the hoof-plate, so as to permit the interlocking or doweling of this plate with the coinciding surfaces of the shoe-plate, do not rise beyond the normal thickness of the hoof-plate, thus leaving the under surface of the latter substantially smooth and flat to form a bearing for the horse when standing upon it.

The cross-section of the shoe-plate on its flanks corresponds with that of the hoof-plate, its wearing-surface resembling in form that shown in my improved shoe, for which application for Letters Patent was filed July 16, 1885, No. 171,772, while projecting beyond this wearing-surface on the flanks is a rim or flange of metal so shaped as to fit closely against the depressed surface of the hoof-plate, and to surround and fit the bosses raised on the latter, so that the interlocking of the holes through the shoe-plate with the bosses on the hoof-plate serves to thoroughly dowel together the two parts of the shoe. In this way I am enabled to obtain all the advantages inherent in the improved duplex horseshoe described in my pending application, No. 173,614, filed August 5, 1885, while eliminating its feature (objectionable when the hoof-plates are used alone) of projecting hubs or bosses on the under side of the hoof-plate, and I thus obtain for the latter a form and construction which adapt it to use independently of the shoe-plate. If desired, the two plates may be further doweled together by interlocking hubs and recesses around the bolts, as described in my application filed July 16, 1885, No. 171,772. Any suitable means, as well as screw-bolts, may be employed for holding the two plates in close contact.

By means of the several devices above referred to, combined and constructed substantially as I have described, I am enabled to produce a duplex horseshoe in which all of the following advantages are secured, viz: Its two plates are so constructed that the permanent part or hoof-plate is entirely covered by the removable part or shoe-plate, and is thus perfectly protected against wear. Each of the two plates supports and re-enforces the other at all points, so that when united the complete shoe possesses a strength and stiffness practically equal to that of a solid shoe of equal weight. It affords the best possible support for each nail-head independently, protecting them against wear and shock, and permitting them to be located in any desired position on the shoe. It enables the shoe to be properly attached to the foot without separating the two plates. It provides perfectly against all strains and shocks tending to shift the plates upon one another, and accomplishes this so that none of these strains adversely affect the bolts. It permits the heel and toe calks or bearings to be placed as far apart as possible from each other; and, finally, it accomplishes all the foregoing useful results, while providing a hoof-plate which, when the shoe-plate is removed, affords a flat bearing for the horse, not injurious either to the horse or to the floor, and of such character as to be as well adapted to service as the ordinary shoe.

Having thus described my invention, what I claim as new, and desire to secure by Letters Patent, is the following:

1. A hoof-plate having a rabbeted cross-section, and provided with a series of separate bosses rising from the thinner part of the plate, substantially as described.

2. A duplex horseshoe composed of a hoof-plate having a portion of its under surface depressed or removed, so as to form a rabbet, and a shoe-plate, the upper surface of which is coincidently rabbeted, so as to fit into and against the rabbet on the hoof-plate.

3. A duplex horseshoe composed of a hoof-plate having a rabbeted cross-section and provided with a series of separate bosses rising from the thinner part, a shoe-plate fitting into and against the rabbet on the hoof-plate, and containing a series of holes fitting over and around the separate bosses on the hoof-plate, and one or more screw-bolts serving to hold the two plates together.

4. A duplex horseshoe consisting of a hoof-plate having a rabbet or offset on its under surface, with nail-bosses projecting therefrom, and a shoe-plate with one or more openings surrounding and fitting against the bosses on the depressed part of the hoof-plate, substantially as described.

In testimony whereof I have hereunto subscribed my name.

ARNOLD C. HAWES.

Witnesses:
SCHUYLER MERRITT,
HOWARD L. UNDERHILL.